(12) United States Patent
Jeong

(10) Patent No.: US 11,632,402 B2
(45) Date of Patent: Apr. 18, 2023

(54) SECURITY POLICY TRANSLATION IN INTERFACE TO NETWORK SECURITY FUNCTIONS

(71) Applicant: RESEARCH & BUSINESS FOUNDATION SUNGKYUNKWAN UNIVERSITY, Suwon-si (KR)

(72) Inventor: Jaehoon Jeong, Busan (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 272 days.

(21) Appl. No.: 16/938,187

(22) Filed: Jul. 24, 2020

(65) Prior Publication Data

US 2021/0029175 A1 Jan. 28, 2021

(30) Foreign Application Priority Data

Jul. 24, 2019 (KR) .................. 10-2019-0089888
Nov. 4, 2019 (KR) .................. 10-2019-0139815

(51) Int. Cl.
*H04L 9/40* (2022.01)
*H04L 41/0893* (2022.01)
*H04L 41/14* (2022.01)

(52) U.S. Cl.
CPC ........ *H04L 63/205* (2013.01); *H04L 41/0893* (2013.01); *H04L 41/145* (2013.01)

(58) Field of Classification Search
None
See application file for complete search history.

(56) References Cited

U.S. PATENT DOCUMENTS

| | | | |
|---|---|---|---|
| 6,901,440 B1 * | 5/2005 | Bimm | H04L 41/5051 709/225 |
| 2016/0248860 A1 * | 8/2016 | Dunbar | H04L 67/146 |
| 2019/0068598 A1 * | 2/2019 | Kang | H04L 41/0893 |
| 2019/0392137 A1 * | 12/2019 | Beskrovny | G06F 21/54 |

FOREIGN PATENT DOCUMENTS

| | | | | |
|---|---|---|---|---|
| KR | 101863236 B1 * | 6/2018 | | G06F 21/55 |
| KR | 20190049579 A * | 5/2019 | | G06F 21/55 |
| WO | WO-2018097422 A1 * | 5/2018 | | |
| WO | WO-2018101565 A1 * | 6/2018 | | |
| WO | WO-2018169294 A1 * | 9/2018 | | |
| WO | WO-2019088671 A1 * | 5/2019 | | H04L 29/06 |

* cited by examiner

*Primary Examiner* — Arezoo Sherkat
(74) *Attorney, Agent, or Firm* — NSIP Law

(57) ABSTRACT

A method and a device for policy translation of a data converter in a security management system are disclosed.

16 Claims, 16 Drawing Sheets

[FIG. 1]
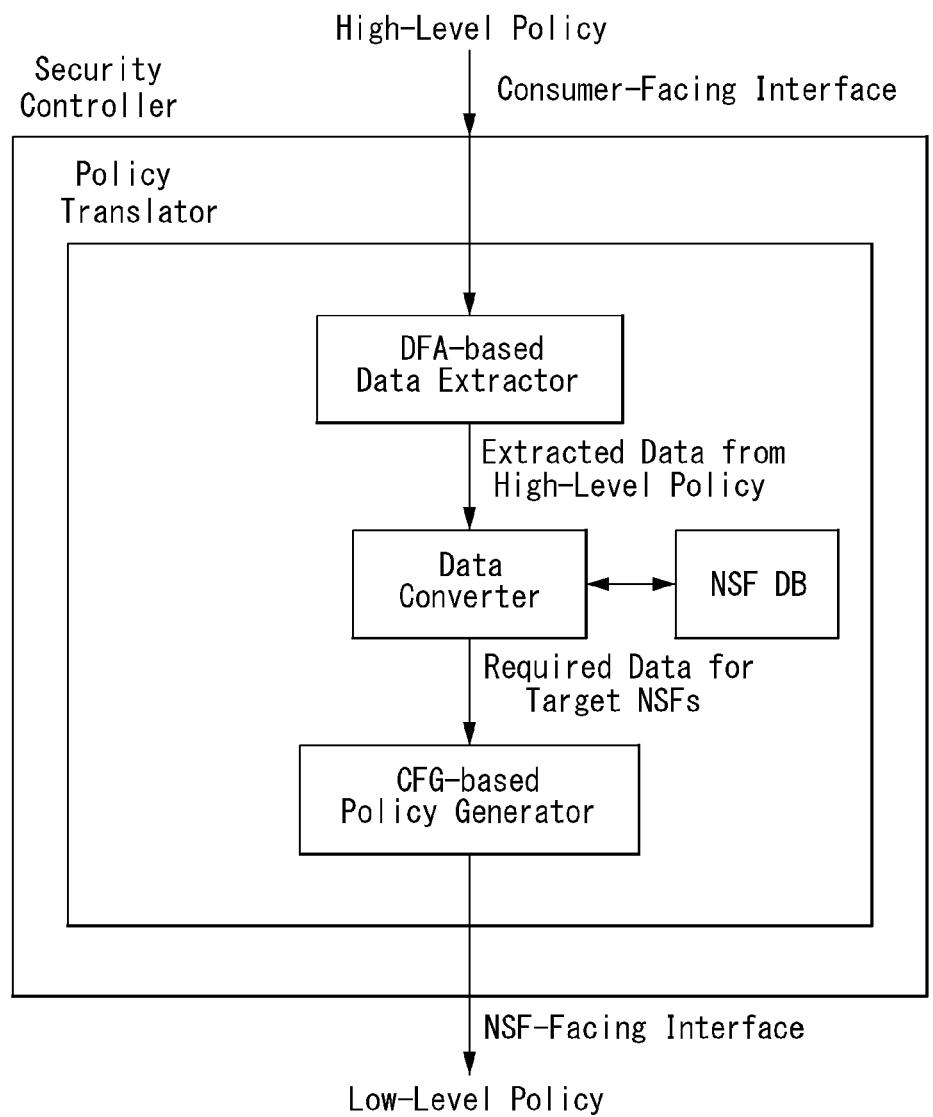

【FIG. 2】
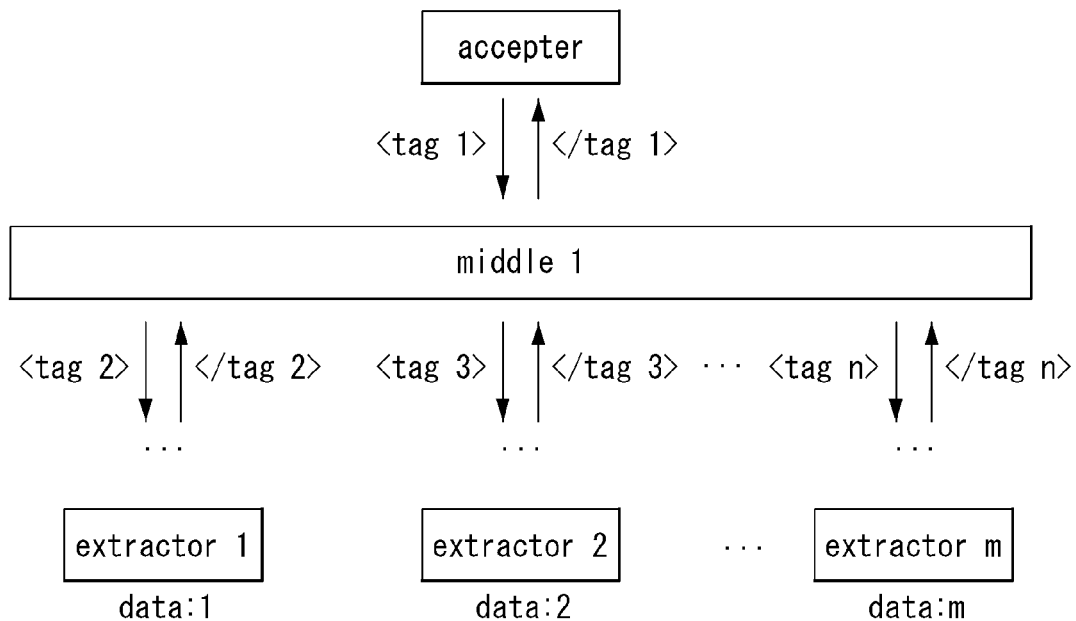
【FIG. 3】
```
<I2NSF>
    <name>block_web</name>
    <cond>
        <src>Son's_PC</src>
        <dest>malicious_websites</dest>
    </cond>
    <action>block<action>
</I2NSF>
```

[FIG. 4]
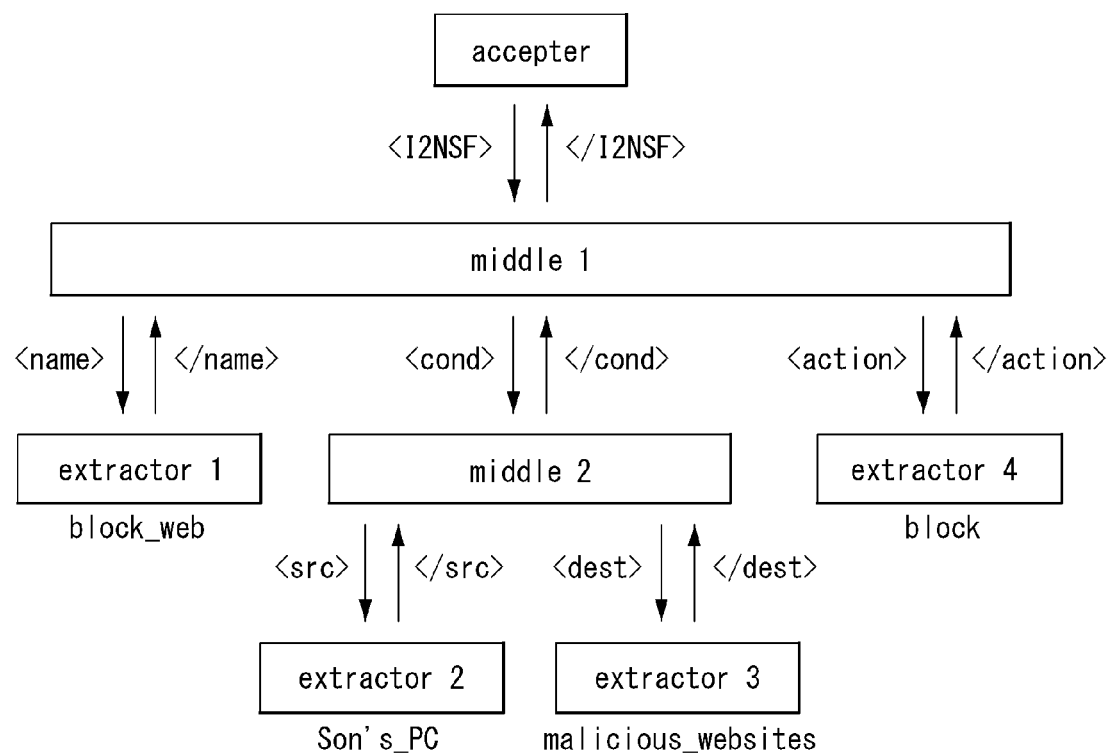

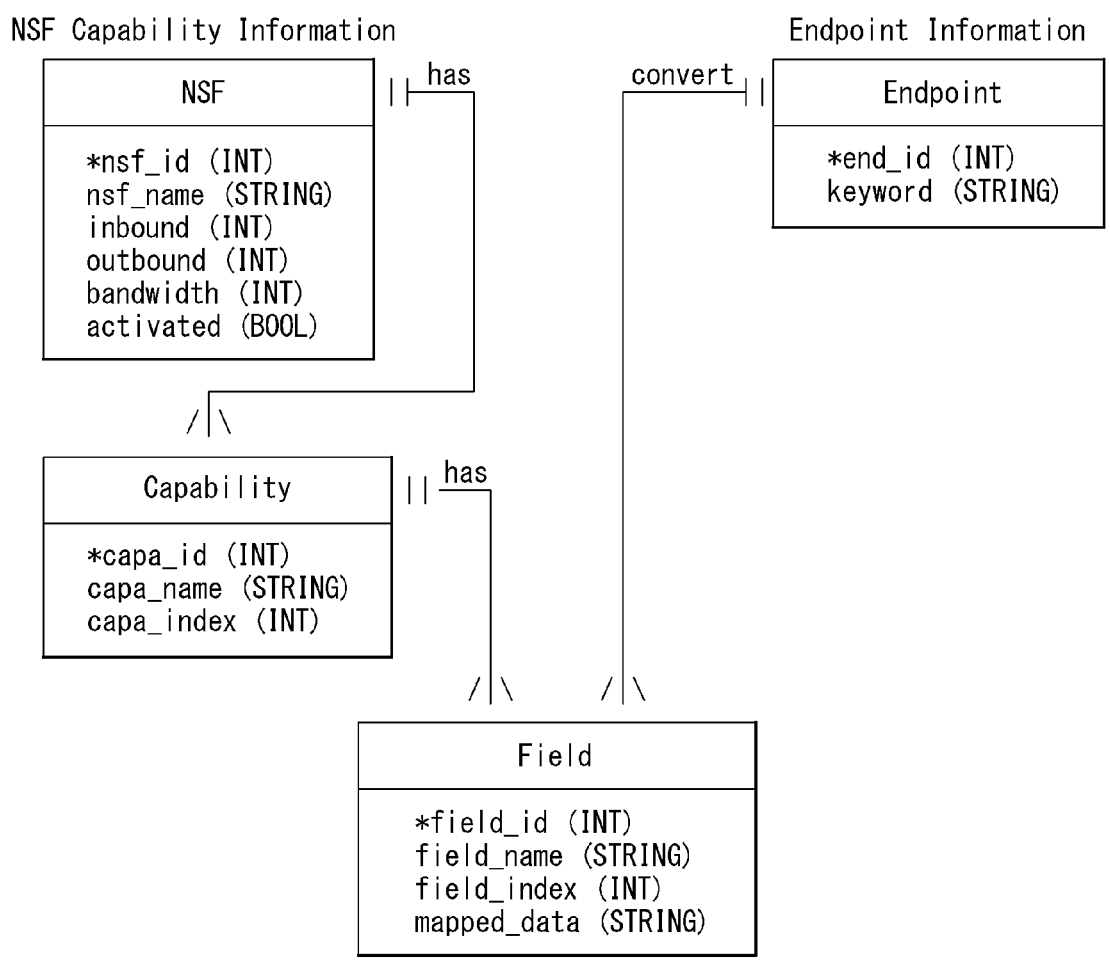
[FIG. 5]

[FIG. 6]
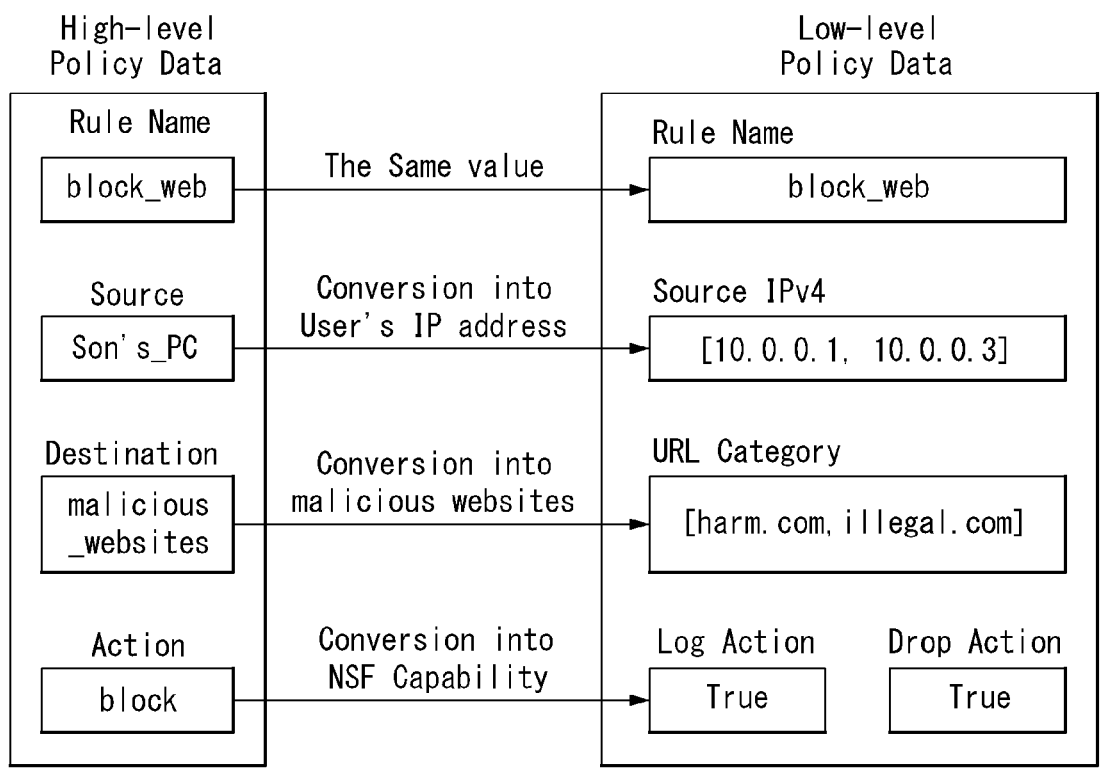

【FIG. 7A】

```
#policy name mapping
/consumer-facing/policy/policy-name
    -> mapping: /nsf-facing/i2nsf-security-policy/system-policy
                /system-policy-name rule name mapping
/consumer-facing/policy/rule/rule-name
    -> mapping: /nsf-facing/i2nsf-security-policy/system-policy
                /rules/rule-name start time mapping
/consumer-facing/policy
/rule/event/time-information/time/begin-time
    -> mapping: /nsf-facing/i2nsf-security-policy/system-policy
                /rules/time-zone/absolute-time-zone/start-time end time mapping
/consumer-facing/policy
/rule/event/time-information/time/end-time
    -> mapping: /nsf-facing/i2nsf-security-policy/system-policy
                /rules/time-zone/absolute-time-zone/end-time firewall-condition source target reference and mapping
/consumer-facing/policy/rule/condition
/firewall-condition/source-target/src-target
    -> reference: /consumer-facing/policy
                  /endpoint-group/user-group/name
        -> extract: /consumer-facing/policy
                    /endpoint-group/user-group/date
            -> mapping: /nsf-facing/i2nsf-security-policy
                        /rule/date
        -> extract: /consumer-facing/policy
                    /endpoint-group/user-group/ip-address
            -> mapping: /nsf-facing/i2nsf-security-policy
                        /system-policy/rules
                        /condition-clause-container
```

【FIG. 7B】

```
                        /packet-security-ipv4-condition
                        /pkt-sec-ipv4-src/ipv4-address/ipv4
        -> extract: /consumer-facing/policy
                        /endpoint-group/user-group/range-ip-address
                        /start-ip-address
            -> mapping: /nsf-facing/i2nsf-security-policy
                        /system-policy/rules
                        /condition-clause-container
                        /packet-security-ipv4-condition
                        /pkt-sec-ipv4-src/range-ipv4-address
                        /start-ipv4-address
        -> extract: /consumer-facing/policy
                        /endpoint-group/user-group/range-ip-address
                        /end-ip-address
            -> mapping: /nsf-facing/i2nsf-security-policy
                        /system-policy/rules
                        /condition-clause-container
                        /packet-security-ipv4-condition
                        /pkt-sec-ipv4-src/range-ipv4-address
                        /end-ipv4-address firewall-condition destination target reference and mapping
/consumer-facing/policy/rule/condition
/firewall-condition/destination-target/dest-target
        -> reference: /consumer-facing/policy
                        /endpoint-group/user-group/name
        -> extract: /consumer-facing/policy
                        /endpoint-group/user-group/date
            -> mapping: /nsf-facing/i2nsf-security-policy
                        /system-policy/rule/date
        -> extract: /consumer-facing/policy
                        /endpoint-group/user-group/ip-address
            -> mapping: /nsf-facing/i2nsf-security-policy
                        /system-policy/rules
                        /condition-clause-container
                        /packet-security-ipv4-condition
                        /pkt-sec-ipv4-dest/ipv4-address/ipv4
        -> extract: /consumer-facing/policy
                        /endpoint-group/user-group
                        /range-ip-address/start-ip-address
            -> mapping: /nsf-facing/i2nsf-security-policy
                        /system-policy/rules
                        /condition-clause-container
                        /packet-security-ipv4-condition
                        /pkt-sec-ipv4-dest/range-ipv4-address
                        /start-ipv4-address
        -> extract: /consumer-facing/policy
                        /endpoint-group/user-group
```

[FIG. 7C]

```
                    /range-ip-address/end-ip-address
        -> mapping: /nsf-facing/i2nsf-security-policy
                    /system-policy/rules
                    /condition-clause-container
                    /packet-security-ipv4-condition
                    /pkt-sec-ipv4-dest/range-ipv4-address
                    /end-ipv4-address ddos-condition source target reference and mapping
/consumer-facing/policy/rule/condition
/ddos-condition/source-target/src-target
    -> reference: /consumer-facing/policy
                  /endpoint-group/device-group/name
      -> extract: /consumer-facing/policy
                  /endpoint-group/device-group/date
        -> mapping: /nsf-facing/i2nsf-security-policy/rule/date
      -> extract: /consumer-facing/policy
                  /endpoint-group/device-group/ip-address
        -> mapping: /nsf-facing/i2nsf-security-policy
                    /system-policy/rules
                    /condition-clause-container
                    /packet-security-ipv4-condition
                    /pkt-sec-ipv4-src/ipv4-address/ipv4
      -> extract: /consumer-facing/policy
                  /endpoint-group/device-group
                  /range-ip-address/start-ip-address
        -> mapping: /nsf-facing/i2nsf-security-policy
                    /system-policy/rules
                    /condition-clause-container
                    /packet-security-ipv4-condition
                    /pkt-sec-ipv4-src/range-ipv4-address
                    /start-ipv4-address
      -> extract: /consumer-facing/policy
                  /endpoint-group/device-group
                  /range-ip-address/end-ip-address
        -> mapping: /nsf-facing/i2nsf-security-policy
                    /system-policy/rules
                    /condition-clause-container
                    /packet-security-ipv4-condition
                    /pkt-sec-ipv4-src/range-ipv4-address
                    /end-ipv4-address ddos-condition destination target reference and mapping
/consumer-facing/policy/rule/condition
/ddos-condition/destination-target/dest-target
    -> reference: /consumer-facing/policy
                  /endpoint-group/device-group/name
      -> extract: /consumer-facing/policy
```

【FIG. 7D】

```
                    /endpoint-group/device-group/date
            -> mapping: /nsf-facing/i2nsf-security-policy/rule/date
         -> extract: /consumer-facing/policy
                    /endpoint-group/device-group/ip-address
            -> mapping: /nsf-facing/i2nsf-security-policy
                        /system-policy/rules
                        /condition-clause-container
                        /packet-security-ipv4-condition
                        /pkt-sec-ipv4-dest/ipv4-address/ipv4
         -> extract: /consumer-facing/policy
                    /endpoint-group/device-group
                    /range-ip-address/start-ip-address
            -> mapping: /nsf-facing/i2nsf-security-policy
                        /system-policy/rules
                        /condition-clause-container
                        /packet-security-ipv4-condition
                        /pkt-sec-ipv4-dest/range-ipv4-address
                        /start-ipv4-address
         -> extract: /consumer-facing/policy
                    /endpoint-group/device-group
                    /range-ip-address/end-ip-address
            -> mapping: /nsf-facing/i2nsf-security-policy
                        /system-policy/rules
                        /condition-clause-container
                        /packet-security-ipv4-condition
                        /pkt-sec-ipv4-dest/range-ipv4-address
                        /end-ipv4-address ddos-condition packet per second mapping
/consumer-facing/policy/rule/condition
/ddos-condition/rate-limit/packet-per-second
    -> mapping: /nsf-facing/i2nsf-security-policy
                /system-policy/rules/condition-clause-container
                /packet-security-ddos-condition/pkt-sec-alert-rate threat-prevention source target reference and mapping
/consumer-facing/policy/rule/condition
/custom-condition/source-target/src-target
    -> reference: /consumer-facing/policy
                  /threat-prevention/payload-content/name
        -> extract: /consumer-facing/policy
                    /threat-prevention/payload-content/date
            -> mapping: /nsf-facing/i2nsf-security-policy
                        /system-policy/rules/date
        -> extract: /consumer-facing/policy
                    /threat-prevention/payload-content/content
            -> mapping: /nsf-facing/i2nsf-security-policy
                        /system-policy/rules
```

[FIG. 7E]

```
                    /condition-clause-container
                    /packet-security-payload-condition
                    /pkt-payload-content threat-prevention destination target reference and mapping
/consumer-facing/policy/rule/condition
/custom-condition/destination-target/dest-target
     -> reference: /consumer-facing/policy
                    /threat-prevention/payload-content/name
        -> extract: /consumer-facing/policy
                    /threat-prevention/payload-content/date
           -> mapping: /nsf-facing/i2nsf-security-policy
                    /system-policy/rules/date
        -> extract: /consumer-facing/policy
                    /threat-prevention/payload-content/content
           -> mapping: /nsf-facing/i2nsf-security-policy
                    /system-policy/rules
                    /condition-clause-container
                    /packet-security-payload-condition
                    /pkt-payload-content threat-feed-condition source target reference and mapping
/consumer-facing/policy/rule/condition
/custom-condition/threat-feed-condition
/source-target/src-target
     -> reference: /consumer-facing/policy
                    /threat-prevention/threat-feed-list/name
        -> extract: /consumer-facing/policy
                    /threat-prevention/threat-feed-list/date
           -> mapping: /nsf-facing/i2nsf-security-policy
                    /system-policy/rules/date
        -> extract: /consumer-facing/policy
                    /threat-prevention/threat-feed-list
                    /threat-feed-server/ip-address
           -> mapping: /nsf-facing/i2nsf-security-policy
                    /system-policy/rules
                    /condition-clause-container
                    /packet-security-ipv4-condition
                    /pkt-sec-ipv4-src/ipv4-address/ipv4
        -> extract: /consumer-facing/policy
                    /threat-prevention/threat-feed-list
                    /threat-feed-server/range-ip-address
                    /start-ip-address
           -> mapping: /nsf-facing/i2nsf-security-policy
                    /system-policy/rules
                    /condition-clause-container
                    /packet-security-ipv4-condition
                    /pkt-sec-ipv4-src/range-ipv4-address
```

【FIG. 7F】

```
                          /start-ipv4-address
        -> extract: /consumer-facing/policy
                    /threat-prevention/threat-feed-list
                    /threat-feed-server/range-ip-address
                    /end-ip-address
            -> mapping: /nsf-facing/i2nsf-security-policy
                        /system-policy/rules
                        /condition-clause-container
                        /packet-security-ipv4-condition
                        /pkt-sec-ipv4-src/range-ipv4-address
                        /end-ipv4-address
        -> extract: /consumer-facing/policy
                    /threat-prevention/threat-feed-list
                    /threat-feed-server
                    /threat-feed-description
            -> mapping: /nsf-facing/i2nsf-security-policy
                        /system-policy/rules
                        /condition-clause-container
                        /packet-security-ipv4-condition
                        /ipv4-description threat-feed-condition destination target reference and mapping
/consumer-facing/policy/rule/condition
/custom-condition/threat-feed-condition
/destination-target/dest-target
        -> reference: /consumer-facing/policy
                      /threat-prevention/threat-feed-list/name
        -> extract: /consumer-facing/policy
                    /threat-prevention/threat-feed-list/date
            -> mapping: /nsf-facing/i2nsf-security-policy
                        /system-policy/rules/date
        -> extract: /consumer-facing/policy
                    /threat-prevention/threat-feed-list
                    /threat-feed-server/ip-address
            -> mapping: /nsf-facing/i2nsf-security-policy
                        /system-policy/rules
                        /condition-clause-container
                        /packet-security-ipv4-condition
                        /pkt-sec-ipv4-dest/ipv4-address/ipv4
        -> extract: /consumer-facing/policy
                    /threat-prevention/threat-feed-list
                    /threat-feed-server/range-ip-address
                    /start-ip-address
            -> mapping: /nsf-facing/i2nsf-security-policy
                        /system-policy/rules
                        /condition-clause-container
                        /packet-security-ipv4-condition
                        /pkt-sec-ipv4-dest/range-ipv4-address
```

[FIG. 7G]

```
                        /start-ipv4-address
        -> extract: /consumer-facing/policy
                        /threat-prevention/threat-feed-list
                        /threat-feed-server/range-ip-address
                        /end-ip-address
            -> mapping: /nsf-facing/i2nsf-security-policy
                        /system-policy/rules
                        /condition-clause-container
                        /packet-security-ipv4-condition
                        /pkt-sec-ipv4-dest/range-ipv4-address
                        /end-ipv4-address
        -> extract: /consumer-facing/policy
                        /threat-prevention/threat-feed-list
                        /threat-feed-server
                        /threat-feed-description
            -> mapping: /nsf-facing/i2nsf-security-policy
                        /system-policy/rules
                        /condition-clause-container
                        /packet-security-ipv4-condition
                        /ipv4-description rule action name mapping
/consumer-facing/policy/rule/action/name
    -> mapping: /nsf-facing/i2nsf-security-policy
                /system-policy/rules/action-clause-container
                /packet-action/ingress-action
    -> mapping: /nsf-facing/i2nsf-security-policy
                /system-policy/rules/action-clause-container
                /packet-action/egress-action
    -> mapping: /nsf-facing/i2nsf-security-policy
                /system-policy/rules/action-clause-container
                /packet-action/log-action
    -> mapping: /nsf-facing/i2nsf-security-policy
                /system-policy/rules/action-clause-container
                /advanced-action/content-security-control
    -> mapping: /nsf-facing/i2nsf-security-policy
                /system-policy/rules/action-clause-container
                /advanced-action/attack-mitigation-control ipsec-method mapping
/consumer-facing/policy/rule/ipsec-method
    -> mapping: /nsf-facing/i2nsf-ipsec policy domain name mapping
/consumer-facing/policy-domain/name
    -> mapping: /nsf-facing/i2nsf-security-policy
                /system-policy/rule-group/groups/group-name
```

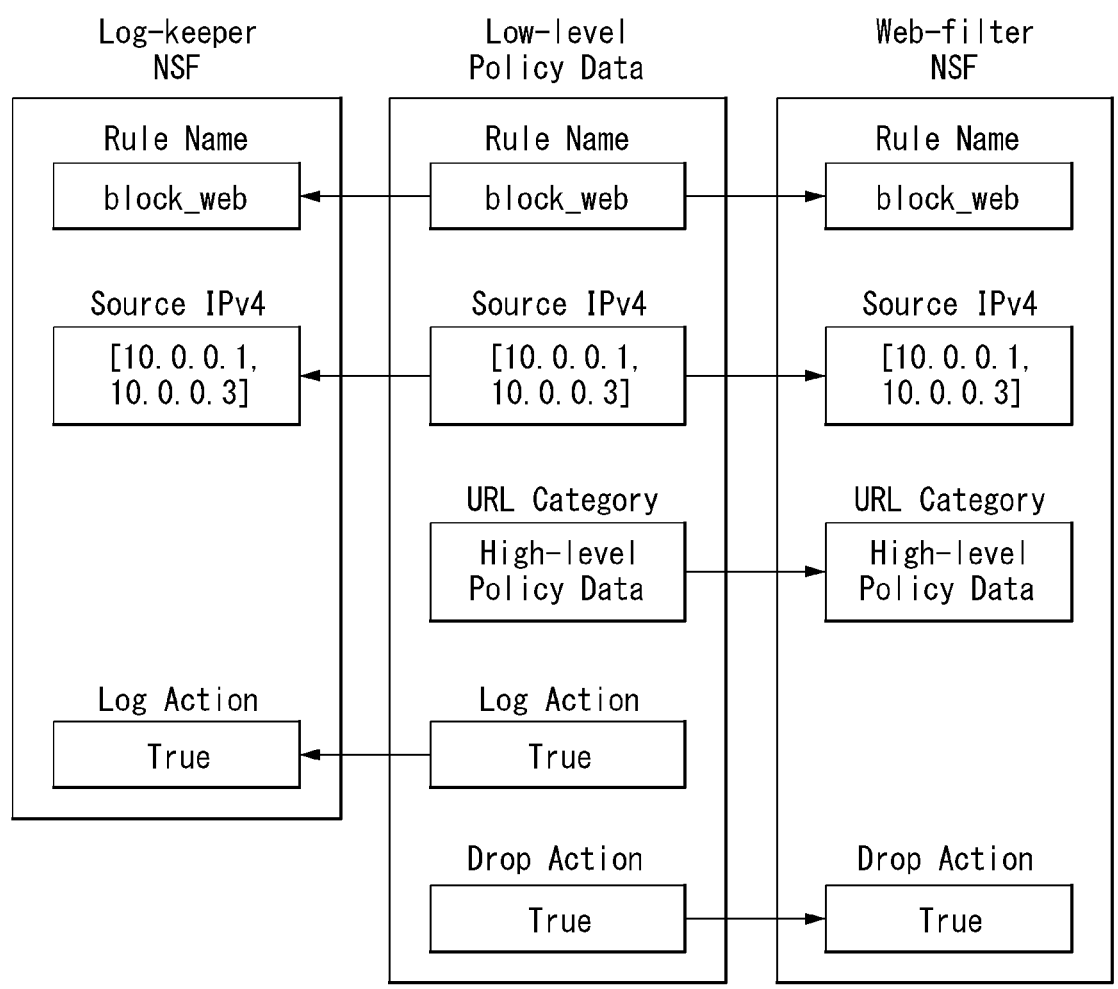
[FIG. 8]

[FIG. 9]
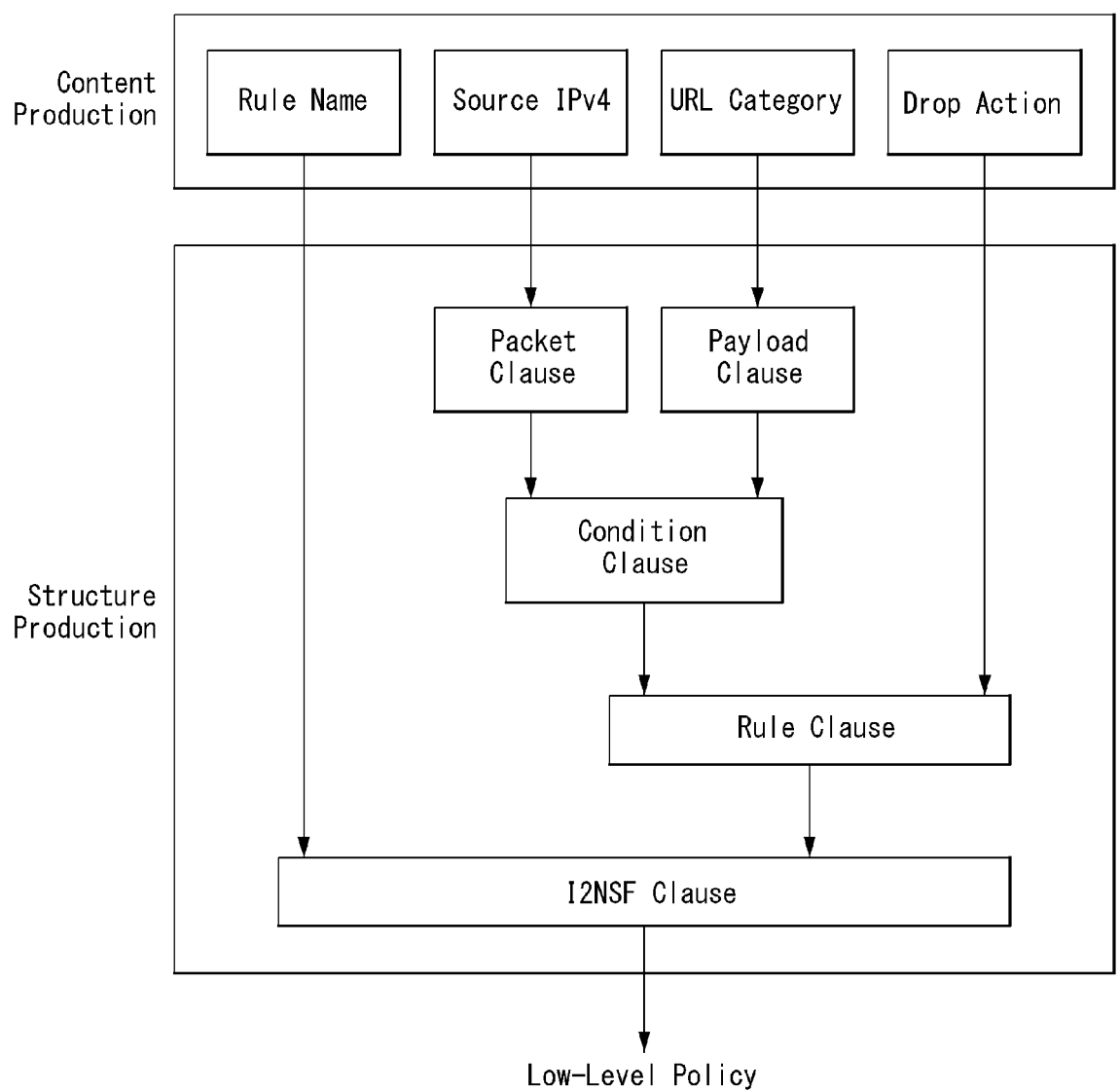

[FIG. 10]

```
<I2NSF>
    <rule-name>block_web</rule-name>
    <rules>
        <condition>
            <packet>
                <ipv4>10.0.0.1</ipv4>
                <ipv4>10.0.0.3</ipv4>
            </packet>
            <payload>
                <url>harm.com</url>
                <url>illegal.com</url>
            </payload>
        </condition>
        <action>drop</action>
    </rules>
</I2NSF>
```

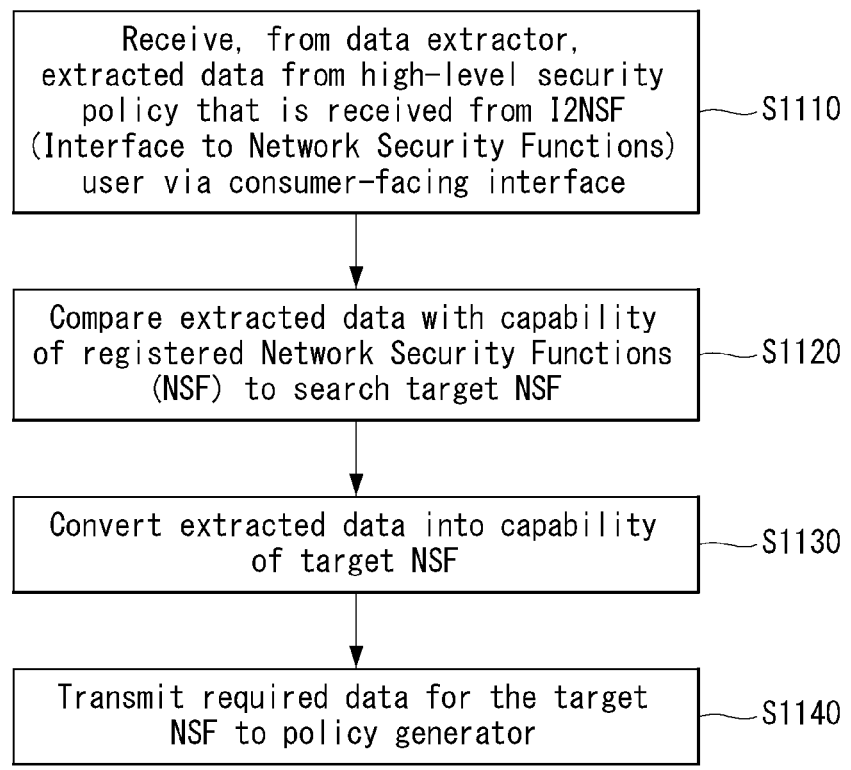
[FIG. 11]

SECURITY POLICY TRANSLATION IN INTERFACE TO NETWORK SECURITY FUNCTIONS

This application claims the priority benefit of Korean Patent Application No. 10-2019-0089888, filed on Jul. 24, 2019, and No. 10-2019-0139815, filed on Nov. 4, 2019, which is incorporated herein by reference for all purposes as if fully set forth herein.

BACKGROUND

Field

The present disclosure relates to a security policy translation method, and more particularly to a method for a security policy translator of a security controller to translate a high-level security policy for security service to a low-level security policy for network security functions (NSF) if an Interface to Network Security Functions (I2NSF) user delivers the high-level policy for security service.

Discussion of Related Art

Information can be quickly accessed regardless of geographical distance by connecting the network to the world. The Internet is essentially a large number of networks in which different levels of hierarchical structures are connected to each other.

The Internet is operated according to transport control protocol (TCP)/internet protocol (IP) published by the Internet Engineering Task Force (IETF), and the TCP/IP can be found in RFC 791 issued by the Request For Comments (RFC) 703 and the IETF.

SUMMARY

The present disclosure provides a method for a security policy translator of a security controller to convert a high-level security policy for security service into a low-level security policy for network security functions (NSF) if an Interface to Network Security Functions (I2NSF) user delivers the high-level security policy for security service.

The technical objects of the present disclosure are not limited to the aforementioned technical objects, and other technical objects, which are not mentioned above, will be apparently appreciated by a person having ordinary skill in the art from the following description.

In one aspect, there is provided a method for policy translation of a data converter in a security management system, the method comprising receiving, from a data extractor, extracted data from a high-level security policy, that is received from an Interface to Network Security Functions (I2NSF) user via a consumer-facing interface; comparing the extracted data with a capability of registered Network Security Functions (NSF) to search a target NSF; converting the extracted data into a capability of the target NSF; and transmitting, to a policy generator, required data for the target NSF.

The extracted data may be extracted through a first state indicating a start or an end of the high-level security policy, a second state for determining a type of the extracted data, and a third state extracting data.

The first state, the second state, and the third state may be transitioned based on a tag character included in the high-level security policy.

The converting into the capability of the target NSF may be performed through an NSF database including endpoint information, NSF capability information, and field information.

The NSF capability information may be acquired from a developer's management system through a registration interface data model and may include an NSF container and an NSF capability container.

The NSF capability container may include a capability name and an index indicating a capability field.

The NSF container may include an NSF name, an NSF specification, and information related to NSF activation.

The field information may include an index related to an NSF-facing interface data model for a low-level security policy.

The policy generator may generate the low-level security policy for the target NSF using the required data.

The low-level security policy may be generated through a content layer related to the high-level security policy and a structure layer for grouping objects with different tags.

In another aspect, there is provided a security controller for policy translation in a security management system, the security controller comprising a data extractor configured to receive a high-level security policy from an Interface to Network Security Functions (I2NSF) user via a consumer-facing interface and transmit extracted data from the high-level security policy to a data converter; the data converter configured to compare the extracted data with a capability of registered Network Security Functions (NSF) to search a target NSF, convert the extracted data into a capability of the target NSF, and transmit required data for the target NSF to a policy generator; and the policy generator configured to receive the required data from the data converter and generate a low-level security policy.

According to the present disclosure, a security policy translator of a security controller can convert a high-level policy for security service into a low-level security policy for NSF if an I2NSF user delivers the high-level policy for security service.

Effects and advantages which can be obtained in the present disclosure are not limited to the aforementioned effects and other unmentioned advantages will be clearly understood by those skilled in the art from the following description.

BRIEF DESCRIPTION OF THE DRAWINGS

The accompanying drawings, that may be included to provide a further understanding of the disclosure and are incorporated in and constitute a part of this specification, illustrate embodiments of the disclosure and together with the description serve to explain various principles of the disclosure.

FIG. 1 illustrates a policy translator of a security controller to which the present disclosure is applicable.

FIG. 2 illustrates a data extractor included in a policy translator to which the present disclosure is applicable.

FIG. 3 illustrates a high-level security policy to which the present disclosure is applicable.

FIG. 4 illustrates a data extractor to which the present disclosure is applicable.

FIG. 5 illustrates an entity relationship diagram (ERD) of network security function (NSF) database to which the present disclosure is applicable.

FIG. 6 illustrates a data conversion to which the present disclosure is applicable.

FIGS. 7A to 7G illustrate mapping information of data conversion to which the present disclosure is applicable.

FIG. 8 illustrates policy provisioning to which the present disclosure is applicable.

FIG. 9 illustrates a generator construction of web-filter NSF to which the present disclosure is applicable.

FIG. 10 illustrates a low-level security policy to which the present disclosure is applicable.

FIG. 11 illustrates an embodiment to which the present disclosure is applicable.

DETAILED DESCRIPTION

Reference will now be made in detail to embodiments of the disclosure, examples of which are illustrated in the accompanying drawings. The detailed description that will be provided in conjunction with the accompanying drawings is intended to explain example embodiments of the present disclosure and is not intended to describe a unique embodiment that can implement the present disclosure. The following detailed description includes details to provide the complete understanding of the present disclosure. However, those skilled in the art know that the present disclosure can be implemented even without the details.

In some embodiments, if it is determined that a detailed description of known arts can obscure embodiments of the present disclosure, the detailed description of the known arts will be omitted, or a blocking diagram focusing on the core capability of the known arts may be illustrated by way of example.

Specific terms that are used in the following description are provided to help the understanding of the present disclosure, and use of these specific terms can be changed in other ways without departing from the technical spirit of the present disclosure.

This document specifies the mapping between a high-level security policy based on the Consumer-Facing Interface YANG data model and a low-level security policy based on the NSF-Facing Interface YANG data model. Also, it describes an architecture of a security policy translator along with an NSF database, and the process of security policy translation with the NSF database.

This document defines a scheme of a security policy translation in Interface to Network Security Functions (I2NSF) Framework [RFC8329]. First of all, this document explains the necessity of a security policy translator (shortly called policy translator) in the I2NSF framework.

The policy translator resides in Security Controller in the I2NSF framework and translates a high-level security policy to a low-level security policy for Network Security Functions (NSFs). A high-level policy is specified by I2NSF User in the I2NSF framework and is delivered to Security Controller via Consumer-Facing Interface [consumer-facing-inf-dm]. It is translated into a low-level policy by Policy Translator in Security Controller and is delivered to NSFs to execute the rules corresponding to the low-level policy via NSF-Facing Interface [nsf-facing-inf-dm].

Necessity for Policy Translator

Security Controller acts as a coordinator between I2NSF User and NSFs. Also, Security Controller has capability information of NSFs that are registered via Registration Interface [registration-inf-dm] by Developer's Management System [RFC8329]. As a coordinator, Security Controller needs to generate a low-level policy in the form of security rules intended by the high-level policy, which can be understood by the corresponding NSFs.

A high-level security policy is specified by RESTCONF/YANG [RFC8040][RFC6020], and a low-level security policy is specified by NETCONF/YANG [RFC6241] [RFC6020]. The translation from a high-level security policy to the corresponding low-level security policy will be able to rapidly elevate I2NSF in real-world deployment. A rule in a high-level policy can include a broad target object, such as employees in a company for a security service (e.g., firewall and web filter). Such employees may be from human resource (HR) department, software engineering department, and advertisement department. A keyword of employee needs to be mapped to these employees from various departments. This mapping needs to be handled by a policy translator in a flexible way while understanding the intention of a policy specification. Let us consider the following two policies:

Block my son's computers from malicious websites.

Drop packets from the IP address 10.0.0.1 and 10.0.0.3 to harm.com and illegal.com.

The above two sentences are examples of policies for blocking malicious websites. Both policies are for the same operation. However, NSF cannot understand the first policy, because the policy does not have any specified information for NSF. To set up the policy at an NSF, the NSF MUST receive at least the source IP address and website address for an operation. It means that the first sentence is NOT compatible for an NSF policy. Conversely, when I2NSF Users request a security policy to the system, they never make a security policy like the second example. For generating a security policy like the second sentence, the user MUST know that the NSF needs to receive the specified information, source IP address and website address. It means that the user understands the NSF professionally, but there are not many professional users in a small size of company or at a residential area. In conclusion, the I2NSF User prefers to issue a security policy in the first sentence, but an NSF will require the same policy as the second sentence with specific information. Therefore, an advanced translation scheme of security policy is REQUIRED in I2NSF.

This document proposes an approach using Automata theory [Automata] for the policy translation, such as Deterministic Finite Automaton (DFA) and Context Free Grammar (CFG). Note that Automata theory is the foundation of programming language and compiler. Thus, with this approach, I2NSF User can easily specify a high-level security policy that will be enforced into the corresponding NSFs with a compatibly low-level security policy with the help of Policy Translator. Also, for easy management, a modularized translator structure is proposed.

Design of Policy Translator

Commonly used security policies are created as XML (Extensible Markup Language) [XML] files. A popular way to change the format of an XML file is to use an XSLT (Extensible Stylesheet Language Transformation) [XSLT] document. XSLT is an XML-based language to transform an input XML file into another output XML file. However, the use of XSLT makes it difficult to manage the policy translator and to handle the registration of new capabilities of NSFs. With the necessity for a policy translator, this document describes a policy translator based on Automata theory.

1. Overall Structure of Policy Translator

FIG. 1 shows the overall design for Policy Translator in Security Controller. There are three main components for Policy Translator:

Data Extractor, Data Converter, and Policy Generator.

Extractor is a DFA-based module for extracting data from a high-level policy which I2NSF User delivered via Consumer-Facing Interface. Data Converter converts the extracted data to the capabilities of target NSFs for a low-level policy. It refers to an NSF Database (DB) in order to convert an abstract subject or object into the corresponding concrete subject or object (e.g., IP address and website URL). Policy Generator generates a low-level policy which will execute the NSF capabilities from Converter.

2. DFA-Based Data Extractor

1) Design of DFA-based Data Extractor

FIG. 2 shows a design for Data Extractor in the policy translator.

If a high-level policy contains data along the hierarchical structure of the standard Consumer-Facing Interface YANG data model [consumer-facing-inf-dm], data can be easily extracted using the state transition machine, such as DFA. The extracted data can be processed and used by an NSF to understand it. Extractor can be constructed by designing a DFA with the same hierarchical structure as a YANG data model.

After constructing a DFA, Data Extractor can extract all of data in the entered high-level policy by using state transitions. Also, the DFA can easily detect the grammar errors of the high-level policy. The extracting algorithm of Data Extractor is as follows:

1. Start from the 'accepter' state.
2. Read the next tag from the high-level policy.
3. Transit to the corresponding state.
4. If the current state is in 'extractor', extract the corresponding data, and then go back to step 2.
5. If the current state is in 'middle', go back to step 2.
6. If there is no possible transition and arrived at 'accepter' state, the policy has no grammar error. Otherwise, there is a grammar error, so stop the process with failure.

2) Example Scenario for Data Extractor

To explain the Data Extractor process by referring to an example scenario, assume that Security Controller received a high-level policy for a web-filtering as shown in FIG. 3. Then we can construct DFA-based Data Extractor by using the design as shown in FIG. 2. FIG. 4 shows the architecture of Data Extractor that is based on the architecture in FIG. 2 along with the input high-level policy in FIG. 3. Data Extractor can automatically extract all of data in the high-level policy according to the following process:

1. Start from the 'accepter' state.
2. Read the first opening tag called '<I2NSF>', and transit to the 'middle 1' state.
3. Read the second opening tag called '<name>', and transit to the 'extractor 1' state.
4. The current state is an 'extractor' state. Extract the data of 'name' field called 'block_web'.
5. Read the second closing tag called '</name>', and go back to the 'middle 1' state.
6. Read the third opening tag called '<cond>', and transit to the 'middle 2' state.
7. Read the fourth opening tag called '<src>', and transit to the 'extractor 2' state.
8. The current state is an 'extractor' state. Extract the data of 'src' field called 'Son's_PC'.
9. Read the fourth closing tag called '</src>', and go back to the 'middle 2' state.
10. Read the fifth opening tag called '<dest>', and transit to the 'extractor 3' state.
11. The current state is an 'extractor' state. Extract the data of 'dest' field called 'malicious_websites'.
12. Read the fifth closing tag called '</dest>', and go back to the 'middle 2' state.
13. Read the third closing tag called '</cond>', and go back to the 'middle 1' state.
14. Read the sixth opening tag called '<action>', and transit to the 'extractor 4' state.
15. The current state is an 'extractor' state. Extract the data of 'action' field called 'block'.
16. Read the sixth closing tag called '</action>', and go back to the 'middle 1' state.
17. Read the first closing tag called '</I2NSF>', and go back to the 'accepter' state.
18. There is no further possible transition, and the state is finally on 'accepter' state. There is no grammar error in FIG. 3 so the scanning for data extraction is finished.

The above process is constructed by an extracting algorithm. After finishing all the steps of the above process, Data Extractor can extract all of data in FIG. 3, 'block_web', 'Son's_PC', 'malicious', and 'block'.

Since the translator is modularized into a DFA structure, a visual understanding is feasible. Also, the performance of Data Extractor is excellent compared to one-to-one searching of data for a particular field. In addition, the management is efficient because the DFA completely follows the hierarchy of Consumer-Facing Interface. If I2NSF User wants to modify the data model of a high-level policy, it only needs to change the connection of the relevant DFA node.

3. Data Converter

1) Role of Data Converter

Every NSF has its own unique capabilities. The capabilities of an NSF are registered into Security Controller by a Developer's Management System, which manages the NSF, via Registration Interface. Therefore, Security Controller already has all information about the capabilities of NSFs. This means that Security Controller can find target NSFs with only the data (e.g., subject and object for a security policy) of the high-level policy by comparing the extracted data with all capabilities of each NSF. This search process for appropriate NSFs is called by policy provisioning, and it eliminates the need for I2NSF User to specify the target NSFs explicitly in a high-level security policy.

Data Converter selects target NSFs and converts the extracted data into the capabilities of selected NSFs. If Security Controller uses this data convertor, it can provide the policy provisioning function to I2NSF User automatically. Thus, the translator design provides big benefits to the I2NSF Framework.

2) NSF Database

The NSF Database contains all the information needed to convert high-level policy data to low-level policy data. The contents of NSF Database are classified as the following two: "endpoint information" and "NSF capability information".

The first is "endpoint information". Endpoint information is necessary to convert an abstract high-level policy data such as Son's_PC, malicious to a specific low-level policy data such as 10.0.0.1, illegal.com. In the high-level policy, the range of endpoints for applying security policy MUST be provided abstractly. Thus, endpoint information is needed to specify the abstracted high-level policy data. Endpoint information is provided by I2NSF User as the high-level policy through Consumer-Facing Interface, and Security Controller builds NSF Database based on received information.

The second is "NSF capability information". Since capability is information that allows NSF to know what features it can support, NSF capability information is used in policy provisioning process to search the appropriate NSFs through the security policy. NSF capability information is provided by Developer's Management System (DMS) through Registration Interface, and Security Controller builds NSF Database based on received information. In addition, if the NSF sends monitoring information such as initiating information to Security Controller through NSF-Facing Interface, Security Controller can modify NSF Database accordingly.

FIG. 5 shows an Entity-Relationship Diagram (ERD) of NSF Database designed to include both endpoint information received from I2NSF User and NSF capability information received from DMS. By designing the NSF database based on the ERD, all the information necessary for security policy translation can be stored, and the network system administrator can manage the NSF database efficiently.

ERD was expressed by using Crow's Foot notation. Crow's Foot notation represents a relationship between entities as a line and represents the cardinality of the relationship as a symbol at both ends of the line. Attributes prefixed with * are key values of each entity. A link with two vertical lines represents one-to-one mapping, and a bird-shaped link represents one-to-many mapping. An NSF entity stores the NSF name (nsf_name), NSF specification (inbound, outbound, bandwidth), and NSF activation (activated). A Capability entity stores the capability name (capa_name) and the index of the capability field in a Registration Interface Data Model (capa_index). An Endpoint entity stores the keyword of abstract data conversion from I2NSF User (keyword). A Field entity stores the field name (field_name), the index of the field index in an NSF-Facing Interface Data Model, and converted data by referring to the Endpoint entity and a 'convert' relationship.

3) Data Conversion in Data Converter

FIG. 6 shows an example for describing a data conversion in Data Converter. High-level policy data MUST be converted into low-level policy data which are compatible with NSFs. If a system administrator attaches a database to Data Converter, it can convert contents by referring to the database with SQL queries. Data conversion in FIG. 6 is based on the following list:

'Rule Name' field does NOT need the conversion.
'Source' field SHOULD be converted into a list of target IPv4 addresses.
'Destination' field SHOULD be converted into a URL category list of malicious websites.
'Action' field SHOULD be converted into the corresponding action(s) in NSF capabilities.

FIGS. 7A to 7G show a mapping list of data fields between Consumer-Facing Interface Data Model and NSF-Facing Interface Data Model. FIGS. 7A to 7G describe the process of passing the data value to the appropriate data field of the Data Model in detail after the data conversion.

4) Policy Provisioning

Generator searches for proper NSFs which can cover all of capabilities in the high-level policy. Generator searches for target NSFs by comparing only NSF capabilities which is registered by Vendor Management System. This process is called by "policy provisioning" because Generator finds proper NSFs by using only the policy. If target NSFs are found by using other data which is not included in a user's policy, it means that the user already knows the specific knowledge of an NSF in the I2NSF Framework. FIG. 8 shows an example of policy provisioning. In this example, log-keeper NSF and web-filter NSF are selected for covering capabilities in the security policy. All of capabilities can be covered by two selected NSFs.

CFG-Based Policy Generator

Generator makes low-level security policies for each target NSF with the extracted data. We constructed Generator by using Context Free Grammar (CFG). CFG is a set of production rules which can describe all possible strings in a given formal language (e.g., programming language). The low-level policy also has its own language based on a YANG data model of NSF-Facing Interface. Thus, we can construct the productions based on the YANG data model. The productions that makes up the low-level security policy are categorized into two types, 'Content Production' and 'Structure Production'.

1) Content Production

Content Production is for injecting data into low-level policies to be generated. A security manager (i.e., a person (or software) to make productions for security policies) can construct Content Productions in the form of an expression as the following productions:

[cont_prod] -> [cont_prod][cont_prod] (Where duplication is allowed.)
[cont_prod] -> <cont_tag>[cont_data]</cont_tag>
[cont_data] -> data_1 | data_2 | . . . | data_n Square brackets mean non-terminal state. If there are no non-terminal states, it means that the string is completely generated. When the duplication of content tag is allowed, the security manager adds the first production for a rule. If there is no need to allow duplication, the first production can be skipped because it is an optional production.

The second production is the main production for Content Production because it generates the tag which contains data for low-level policy. Last, the third production is for injecting data into a tag which is generated by the second production. If data is changed for an NSF, the security manager needs to change "only the third production" for data mapping in each NSF.

For example, if the security manager wants to express a low-level policy for source IP address, Content Production can be constructed in the following productions:

[cont_ipv4] -> [cont_ipv4][cont_ipv4] (Allow duplication.)
[cont_ipv4] -> <ipv4>[cont_ipv4_data]</ipv4>
[cont_ipv4_data] -> 10.0.0.1 | 10.0.0.3

2) Structure Production

Structure Production is for grouping other tags into a hierarchy. The security manager can construct Structure Production in the form of an expression as the following production:

[struct_prod] -> <struct_tag>[prod_1] . . . [prod_n]</struct_tag>

Structure Production can be expressed as a single production. The above production means to group other tags by the name of a tag which is called by 'struct_tag'. [prod_x] is a state for generating a tag which wants to be grouped by Structure Production. [prod_x] can be both Content Production and Structure Production. For example, if the security manager wants to express the low-level policy for the I2NSF tag, which is grouping 'name' and 'rules', Structure Production can be constructed as the following production where [cont_name] is the state for Content Production and [struct_rule] is the state for Structure Production.

[struct_i2nsf] -> <I2NSF>[cont_name][struct_rules]</I2NSF>

3) Generator Construction

The security manager can build a generator by combining the two productions which are described in Section 1) and 2).

FIG. 9 shows the CFG-based Generator construction of the web-filter NSF. It is constructed based on the NSF-Facing Interface Data Model in [nsf-facing-inf-dm]. According to FIG. 9, the security manager can express productions for each clause as in following CFG:

1. [cont_name] -> <rule-name>[cont_name_data]</rule-name>
2. [cont_name_data] -> block_web
3. [cont_ipv4] -> [cont_ipv4][cont_ipv4] (Allow duplication)
4. [cont_ipv4] -> <ipv4>[cont_ipv4_data]</ipv4>
5. [cont_ipv4_data] -> 10.0.0.1 | 10.0.0.3
6. [cont_url] -> [cont_url][cont_url] (Allow duplication)
7. [cont_url] -> <url>[cont_url_data]</url>
8. [cont_url_data] -> harm.com | illegal.com
9. [cont_action] -> <action>[cont_action_data]</action>
10. [cont_action_data] -> drop
11. [struct_packet] -> <packet>[cont_ipv4]</packet>
12. [struct_payload] -> <payload>[cont_url]</payload>
13. [struct_cond] -> <condition>[struct_packet][struct_payload]</condition>
14. [struct_rules] -> <rules>[struct_cond][cont_action]</rules>
15. [struct_i2nsf] -> <I2NSF>[cont_name][struct_rules]</I2NSF>

Then, Generator generates a low-level policy by using the above CFG. The low-level policy is generated by the following process:

1. Start: [struct_i2nsf]
2. Production 15: <I2NSF>[cont_name][struct_rules]</I2NSF>
3. Production 1: <I2NSF><rule-name>[cont_name_data]</rule-name>[struct_rules]</I2NSF>
4. Production 2: <I2NSF><rule-name>block_web</rule-name>[struct_rules]</I2NSF>
5. Production 14: <I2NSF><rule-name>block_web</rule-name><rules>[struct_cond][cont_action]</rules></I2NSF>
6. Production 13: <I2NSF><rule-name>block_web</rule-name><rules><condition>[struct_packet][struct_payload]</condition>[cont_action] </rules></I2NSF>
7. Production 11: <I2NSF><rule-name>block_web</rule-name><rules><condition><packet>[cont_ipv4]</packet>[struct_payload]</condition>[cont_action]</rules></I2NSF>
8. Production 3: <I2NSF><rule-name>block_web</rule-name><rules><condition><packet>[cont_ipv4][cont_ipv4]</packet>[struct_payload]</condition>[cont_action]</rules></I2NSF>
9. Production 4: <I2NSF><rule-name>block_web</rule-name><rules><condition><packet><ipv4>[cont_ipv4_data]</ipv4><ipv4>[cont_ipv4_data] </ipv4></packet>[struct_payload]</condition>[cont_action]</rules></I2NSF>
10. Production 5: <I2NSF><rule-name>block_web</rule-name><rules><condition><packet><ipv4>10.0.0.1</ipv4><ipv4>10.0.0.3</ipv4></packet>[struct_payload]</condition>[cont_action]</rules></I2NSP>
11. Production 12: <I2NSF><rule-name>block_web</rule-name><rules><condition><packet><ipv4>10.0.0.1</ipv4><ipv4>10.0.0.3</ipv4></packet><payload>[cont_url]</payload></condition>[cont_action]</rules></I2NSF>
12. Production 6: <I2NSF><rule-name>block_web</rule-name><rules><condition><packet><ipv4>10.0.0.1</ipv4><ipv4>10.0.0.3</ipv4></packet><payload>[cont_url][cont_url]</payload></condition>[cont_action]</rules></I2NSF>
13. Production 7: <I2NSF><rule-name>block_web</rule-name><rules><condition><packet><ipv4>10.0.0.1</ipv4><ipv4>10.0.0.3</ipv4></packet><payload><url>[cont_url_data]</url><url>[cont_url_data]</url></payload></condition>[cont_action]</rules></I2NSF>
14. Production 8: <I2NSF><rule-name>block_web</rule-name><rules><condition><packet><ipv4>10.0.0.1</ipv4><ipv4>10.0.0.3</ipv4></packet><payload><url>harm.com</url><url>illegal.com</url></payload></condition>[cont_action]</rules></I2NSF>
15. Production 9: <I2NSF><rule-name>block_web</rule-name><rules><condition><packet><ipv4>10.0.0.1</ipv4><ipv4>10.0.0.3</ipv4></packet><payload><url>harm.com</url><url>illegal.com</url></payload></condition><action>[cont_action_data]</action></rules></I2NSF>
16. Production 10: <I2NSF><rule-name>block_web</rule-name><rules><condition><packet><ipv4>10.0.0.1</ipv4><ipv4>10.0.0.3</ipv4></packet><payload><url>harm.com</url><url>illegal.com</url></payload></condition><action>drop</action></rules></I2NSF>

The last production has no non-terminal state, and the low-level policy is completely generated. FIG. 10 shows the generated low-level policy where tab characters and newline characters are added.

Implementation Considerations

The implementation considerations in this document include the following three: "data model auto-adaptation", "data conversion", and "policy provisioning".

1) Data Model Auto-adaptation

Security Controller which acts as the intermediary MUST process the data according to the data model of the connected interfaces. However, the data model can be changed flexibly depending on the situation, and Security Controller may adapt to the change. Therefore, Security Controller can be implemented for convenience so that the security policy translator can easily adapt to the change of the data model.

The translator constructs and uses the DFA to adapt to Consumer-Facing Interface Data Model. In addition, the CFG is constructed and used to adapt to NSF-Facing Interface Data Model. Both the DFA and the CFG follow the same tree structure of YANG Data Model.

The DFA starts at the node and expands operations by changing the state according to the input. Based on the YANG Data Model, a container node is defined as a middle state and a leaf node is defined as an extractor node. After that, if the nodes are connected in the same way as the hierarchical structure of the data model, Security Controller can automatically construct the DFA. The DFA can be conveniently built by investigating the link structure using the stack, starting with the root node.

The CFG starts at the leaf nodes and is grouped into clauses until all the nodes are merged into one node. A leaf node is defined as the content production, and a container node is defined as the structure production. After that, if the nodes are connected in the same way as the hierarchy of the data model, Security Controller can automatically construct the CFG. The CFG can be conveniently constructed by investigating the link structure using the priority queue data, starting with the leaf nodes.

2) Data Conversion

Security Controller requires the ability to materialize the abstract data in the high-level security policy and forward it to NSFs. Security Controller can receive endpoint information as keywords through the high-level security policy. At this time, if the endpoint information corresponding to the keyword is mapped and the query is transmitted to the NSF Database, the NSF Database can be conveniently registered with necessary information for data conversion. When a policy tries to establish a policy through the keyword, Security Controller searches the details corresponding to the keyword registered in the NSF Database and converts the keywords into the appropriate and specified data.

3) Policy Provisioning

This document stated that policy provisioning function is necessary to enable users without expert security knowledge to create policies. Policy provisioning is determined by the capability of the NSF. If the NSF has information about the capability in the policy, the probability of selection increases.

Most importantly, selected NSFs may be able to perform all capabilities in the security policy. This document recommends a study of policy provisioning algorithms that are highly efficient and can satisfy all capabilities in the security policy.

Features of Policy Translator Design

First, by showing a visualized translator structure, the security manager can handle various policy changes. Translator can be shown by visualizing DFA and Context-free Grammar so that the manager can easily understand the structure of Policy Translator.

Second, if I2NSF User only keeps the hierarchy of the data model, I2NSF User can freely create high-level policies. In the case of DFA, data extraction can be performed in the same way even if the order of input is changed. The design of the policy translator is more flexible than the existing method that works by keeping the tag's position and order exactly.

Third, the structure of Policy Translator can be updated even while Policy Translator is operating. Because Policy Translator is modularized, the translator can adapt to changes in the NSF capability while the I2NSF framework is running. The function of changing the translator's structure can be provided through Registration Interface.

Security Considerations

There is no security concern in the proposed security policy translator as long as the I2NSF interfaces (i.e., Consumer-Facing Interface, NSF-Facing Interface, and Registration Interface) are protected by secure communication channels.

FIG. 11 illustrates an embodiment to which the present disclosure is applicable.

Referring to FIG. 11, a security controller includes a data extractor, a data converter, and a policy generator.

The data converter receives, from the data extractor, extracted data from a high-level security policy, that is received from an Interface to Network Security Functions (I2NSF) user via a consumer-facing interface, in S1110.

The data converter compares the extracted data with a capability of registered Network Security Functions (NSF) to search a target NSF in S1120.

The data converter converts the extracted data into a capability of the target NSF in S1130.

The data converter transmits, to the policy generator, required data for the target NSF in S1140.

The embodiments described above are implemented by combinations of components and features of the present disclosure in predetermined forms. Each component or feature should be considered selectively unless specified separately. Each component or feature can be carried out without being combined with another component or feature. Moreover, some components and/or features are combined with each other and can implement embodiments of the present disclosure. The order of operations described in embodiments of the present disclosure can be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present disclosure can be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

The present disclosure can applied to various security management systems.

What is claimed is:

1. A method for performing, by a security controller, policy translation in a security management system, the method comprising:
   receiving, by the security controller, extracted data from a high-level security policy, that is received from an Interface to Network Security Functions (I2NSF) user via a consumer-facing interface;
   searching, by the security controller, a target NSF based on the extracted data and a capability of registered Network Security Function (NSF),
      wherein the extracted data is extracted through a first state indicating a start or an end of the high-level security policy, a second state for determining a type of the extracted data, and a third state extracting data;
   converting, by the security controller, the extracted data into a capability of the target NSF; and
   generating, by the security controller, a low-level security policy for the target NSF based on the capability of the target NSF.

2. The method of claim 1, wherein the first state, the second state, and the third state are transitioned based on a tag character included in the high-level security policy.

3. The method of claim 1, wherein the converting into the capability of the target NSF is performed through an NSF database including endpoint information, NSF capability information, and field information.

4. The method of claim 3, wherein the NSF capability information is acquired from a developer's management system through a registration interface data model and includes an NSF container and an NSF capability container.

5. The method of claim 4, wherein the NSF capability container includes a capability name and an index indicating a capability field.

6. The method of claim 5, wherein the NSF container includes an NSF name, an NSF specification, and information related to NSF activation.

7. The method of claim 6, wherein the field information includes an index related to an NSF-facing interface data model for a low-level security policy.

8. The method of claim 1, wherein the low-level security policy is generated through a content layer related to the high-level security policy and a structure layer for grouping objects with different tags.

9. A security controller for performing policy translation in a security management system, the security controller configured to:
receive extracted data from a high-level security policy, that is received from an Interface to Network Security Function (I2NSF) user via a consumer-facing interface,
search a target NSF based on the extracted data and a capability of registered Network Security Function (NSF),
wherein the extracted data is extracted through a first state indicating a start or an end of the high-level security policy, a second state for determining a type of the extracted data, and a third state extracting data,
convert the extracted data into a capability of the target NSF, and
generate a low-level security policy for the target NSF based on the capability of the target NSF.

10. The security controller of claim 9, wherein the first state, the second state, and the third state are transitioned based on a tag character included in the high-level security policy.

11. The security controller of claim 9, wherein converting into the capability of the target NSF is performed through an NSF database including endpoint information, NSF capability information, and field information.

12. The security controller of claim 11, wherein the NSF capability information is acquired from a developer's management system through a registration interface data model and includes an NSF container and an NSF capability container.

13. The security controller of claim 12, wherein the NSF capability container includes a capability name and an index indicating a capability field.

14. The security controller of claim 13, wherein the NSF container includes an NSF name, an NSF specification, and information related to NSF activation.

15. The security controller of claim 14, wherein the field information includes an index related to an NSF-facing interface data model for the low-level security policy.

16. The security controller of claim 15, wherein the low-level security policy is generated through a content layer related to the high-level security policy and a structure layer for grouping objects with different tags.

* * * * *